(12) United States Patent
Singer et al.

(10) Patent No.: US 8,320,644 B2
(45) Date of Patent: Nov. 27, 2012

(54) OBJECT DETECTION METADATA

(75) Inventors: David William Singer, San Francisco, CA (US); Courtney Ann Kennedy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 12/815,959

(22) Filed: Jun. 15, 2010

(65) Prior Publication Data

US 2011/0305394 A1 Dec. 15, 2011

(51) Int. Cl.
*G06K 9/00* (2006.01)
(52) U.S. Cl. ........ 382/118; 382/190; 382/128; 382/224; 382/103; 382/100; 382/115; 382/117; 382/289; 382/294; 382/296; 382/302; 707/802; 707/769; 707/102
(58) Field of Classification Search .................. 382/118, 382/190, 128, 224, 103, 100, 115, 117, 289, 382/294, 296, 302; 707/802, 769, 102
See application file for complete search history.

(56) References Cited

U.S. PATENT DOCUMENTS

| 6,877,134 B1 | 4/2005 | Fuller et al. |
| 7,529,411 B2 | 5/2009 | Haupt et al. |
| 7,593,551 B2 | 9/2009 | Kamei |
| 2006/0274978 A1 | 12/2006 | Fukuda et al. |
| 2007/0112779 A1 | 5/2007 | Gargi et al. |
| 2009/0046891 A1* | 2/2009 | Ikeda et al. ............... 382/100 |
| 2009/0175509 A1 | 7/2009 | Gonion et al. |
| 2009/0324007 A1 | 12/2009 | Oya |
| 2010/0026842 A1 | 2/2010 | Ishizaka |
| 2010/0316296 A1* | 12/2010 | Chhibber et al. ............. 382/190 |

FOREIGN PATENT DOCUMENTS

EP 1978524 A2 10/2008

OTHER PUBLICATIONS

PCT International Search Report and Written Opinion of the International Searching Authority mailed Oct. 6, 2011 for PCT/US2011/039506, 10 pages.

* cited by examiner

*Primary Examiner* — Mike Rahmjoo
(74) *Attorney, Agent, or Firm* — Blakely, Sokoloff, Taylor & Zafman LLP

(57) ABSTRACT

A perimeter around a detected object in a frame of image data can be generated in a first coordinate system. The perimeter can be converted from the first coordinate system into a second coordinate system having the same aspect ratio as the first coordinate system. A first metadata entry can include dimensions of image data in the second coordinate system. A second metadata entry can provide a location and dimensions of the converted perimeter in the second coordinate space. Additional metadata can indicate matching objects between frames, position of an object relative to other objects in a frame, a probability that an object is correctly detected, and a total number of objects detected across multiple frames of image data.

8 Claims, 13 Drawing Sheets

Face-setup entry 901

Max-id = 7

Width = 100

Height = 75

Detected-face entry 903

X = 15

Y = 20

Width = 32

Height = 26

ID = 3

Layer = 2

DetectWeight = 243

MatchWeight = 173

Fig. 9

OBJECT DETECTION METADATA

FIELD OF THE INVENTION

Embodiments of the invention are generally directed toward object detection metadata.

BACKGROUND

Cameras and other computing devices are increasingly able to pick out the location(s) of objects in photographs and frames of video data. For example, some computing devices can pick out the location(s) of faces (e.g., human faces). Face detection is the process of determining that a face (e.g., human face) appears at a location in still or video image data. Face matching is the process of determining a likelihood that a face detected in one image frame is the same as a face detected in another image frame. A third process is face identification, which is the process of identifying a face by name or other identifier of the face detected.

SUMMARY

In one embodiment, object detection metadata is generated. A perimeter around a detected object in a frame of image data is generated in a first coordinate system. The perimeter is converted from the first coordinate system into a second coordinate system having the same aspect ratio as the first coordinate system. A first metadata entry is generated that includes dimensions of the second coordinate system. A second metadata entry is generated including information defining a location of the detected object and dimensions of the converted perimeter in the second coordinate space.

In another embodiment, the object detection metadata entry includes a third metadata entry including a location and converted perimeter of an additional detected object. The second metadata entry and the third metadata entry may include a layering value. The layering values indicate whether the detected object of the second metadata entry is closer or farther away from a camera than the additional detected object of the third metadata entry.

In still another embodiment, the second metadata entry of the first frame of image data includes a matching value, which may be a unique index value assigned to the detected object. If the object is detected in a different frame of image data, a metadata entry corresponding to the different frame of image data and indicating the location of the object in the different frame of metadata may include the same unique index value to indicate that the two detected objects are the same object.

In another embodiment, the second metadata entry includes a detected object weighting. This weighting indicates a probability that the detected object is in fact the detected object. For example, the detected object weighting may provide a probability that a detected object is in fact a human face.

In yet another embodiment, the second metadata entry includes a matching object weighting. The matching object weighting indicates a probability that two matching objects are in fact the same object. For example, the matching object weighting may provide a probability that two detected objects in different image frames correspond to the face of the same person.

DESCRIPTION OF THE DRAWINGS

The present invention is illustrated by way of example and not limitation in the figures of the accompanying drawings in which like references indicate similar elements.

FIG. 9 is a diagram illustrating object detection metadata formats according to an embodiment of the invention;

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

In one embodiment, object detection metadata describes the location of objects in photographs, video frames, and other image data. The object detection metadata may be stored as clip-based metadata associated with still or video image data, or as timed metadata associated with a video track. Timed metadata may be stored in a metadata track associated with a video track. In one embodiment, the metadata track and video track can be generated in accordance with the QuickTime File Format developed by Apple Inc. of Cupertino, Calif., or in accordance with other file formats.

In one embodiment, object detection metadata can include face detection metadata, which can include metadata for human or animal faces. In other embodiments, object detection metadata can include metadata for other objects detectable in the image data, such as automobiles, license plates on automobiles, or any other detectable objects. Different detection techniques may be used to detect different objects. For example, one technique may be better suited to detecting human faces, whereas another technique may be better suited to detecting non-facial objects. While the description below illustratively applies some embodiments of the present invention to face detection metadata, it will be apparent to one of ordinary skill in the art that the present invention also can be applied to other object detection metadata as well.

Figure 1:
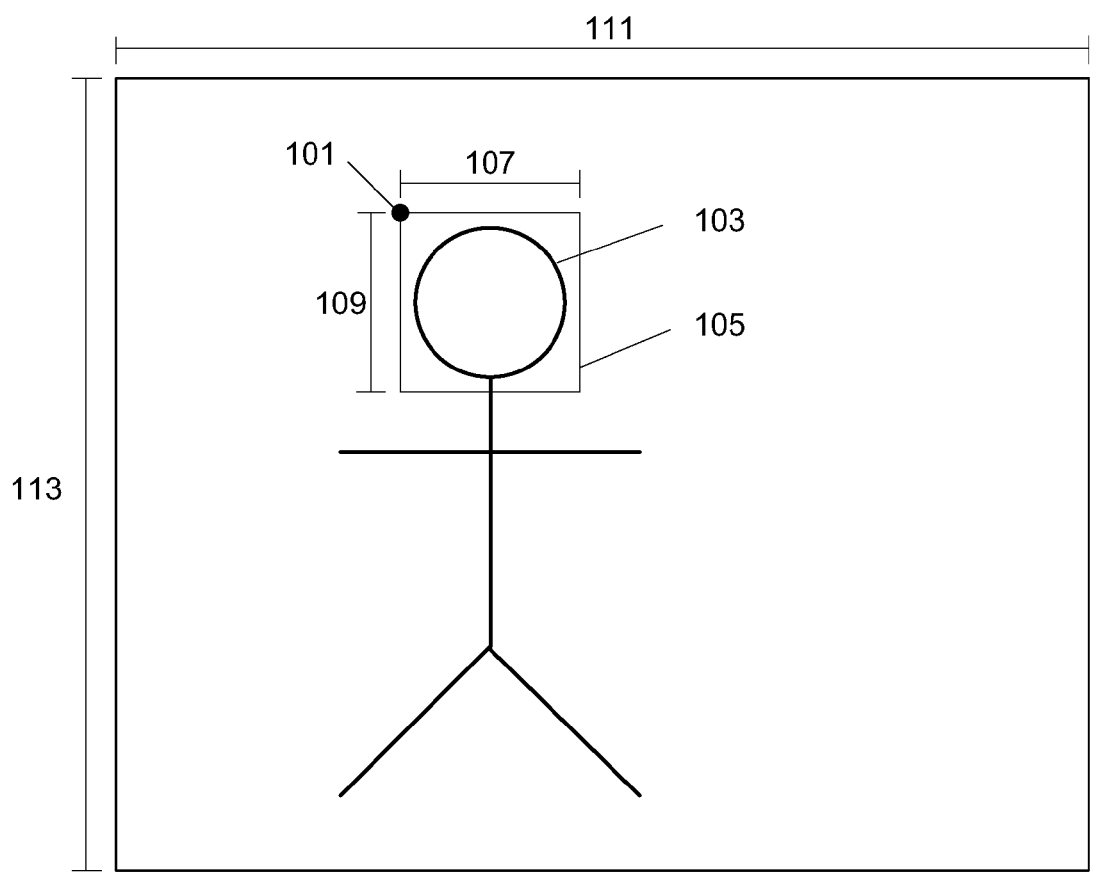
FIG. 1 is a diagram illustrating an object detection perimeter according to an embodiment of the invention.

FIG. 1 is a diagram illustrating an object detection perimeter according to an embodiment of the invention. In one embodiment, the location of each face in a frame of image data may be described with a simple rectangle. The top-left corner, width, and height of the rectangle may be stored in the face detection metadata, which may be referred to as a detected-object or detected-face entry. Detected-face entries are described in greater detail below in conjunction with FIG. 9. Setup information may include the visual dimensions of the frame in pixel-independent, equally-spaced units. In other embodiments, the location of object(s) in a frame of image data may be described with a perimeter of a different shape.

The image illustrated in FIG. 1 has dimensions height 113 and width 111. Face detection rectangle 105 has dimensions of height 109 and width 107 and an initial point 101. Face detection rectangle 105 bounds face 103. The image may be original image data that is scanned for faces, resulting in the generation of face detection rectangle 105. In one embodiment, the dimensions of the image and the rectangle are expressed in pixel-independent coordinates. The pixel-independent coordinates may be chosen to give an approximate indication of the precision of the determination of the face detection process. For example, if the image data has an aspect ratio of 4:3 and the pixel-independent coordinates are set up as 100:75, then the indication is that the rectangles should be placed within approximately 1 part in 100 accuracy (i.e., accurate to within 1% of the video dimensions). The indication may be an approximation.

In one embodiment, to identify the actual pixel values of the face detection rectangle, the dimensions and top-left corner of the rectangle are re-scaled to take into account both the actual size of the image frame and the pixel aspect ratio used in the image frame. In some embodiments, the actual visual aspect ratio of the image frame differs from the aspect ratio of the setup dimensions. This indicates that the image data may have been processed (e.g., cropping, rotation, etc.) without considering the face detection metadata. In these embodiments, the face detection rectangles may be considered unreliable.

Figure 2:
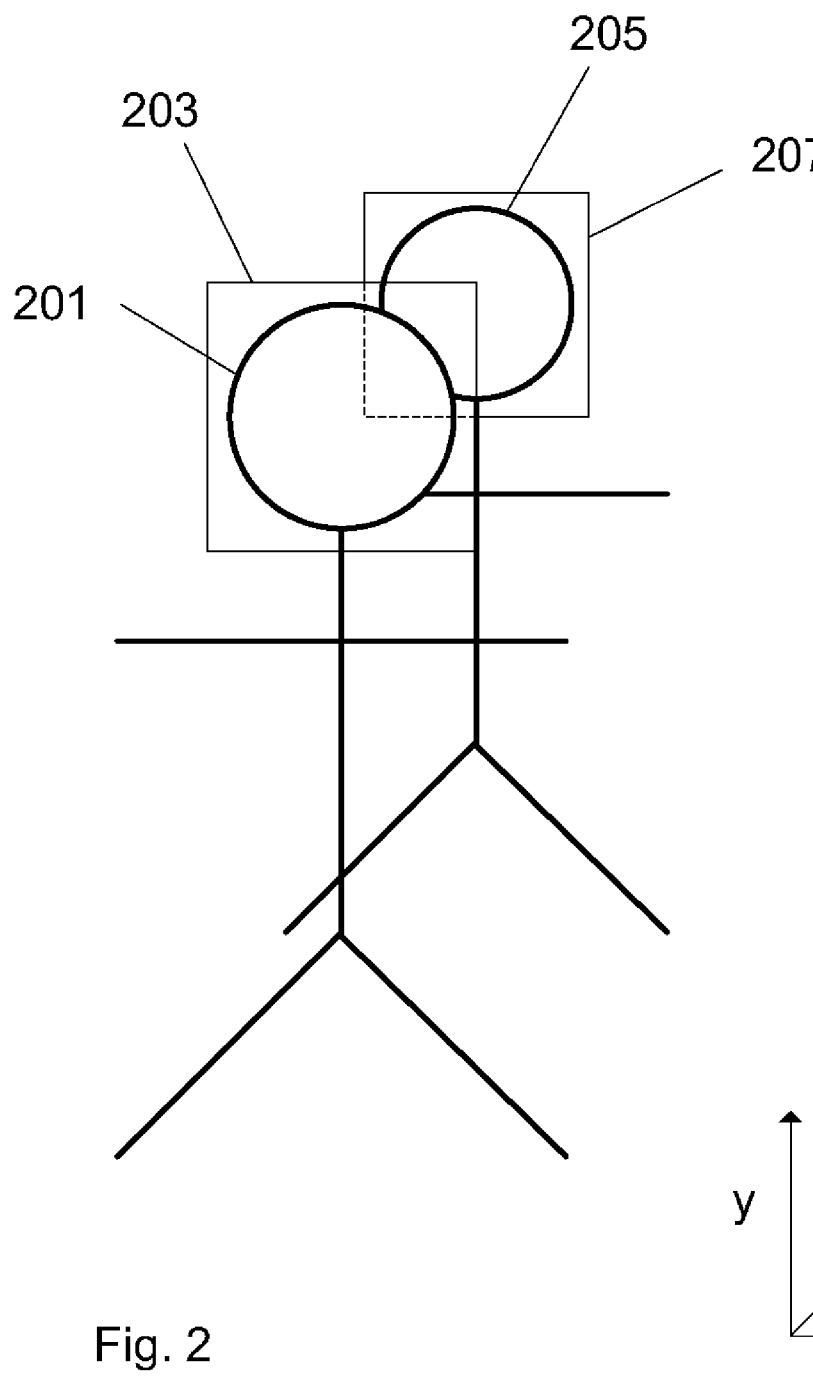
FIG. 2 is a diagram illustrating overlapping object detection perimeters according to an embodiment of the invention.

FIG. 2 is a diagram illustrating overlapping object detection perimeters according to an embodiment of the invention. Objects detected in the image data may overlap. If the object detection process can determine which object is further from the camera, it may assign the further perimeter a higher layer number. Layer zero may be used as a default layer. For example, face 201 is "in front of" face 205 based on the position of the camera that captured the image. In one embodiment, the layering of faces one on top of the other due to the camera position is detected. In this embodiment, face detection rectangle 203 is assigned to a layer above the layer to which face rectangle 207 is assigned.

Figure 3:
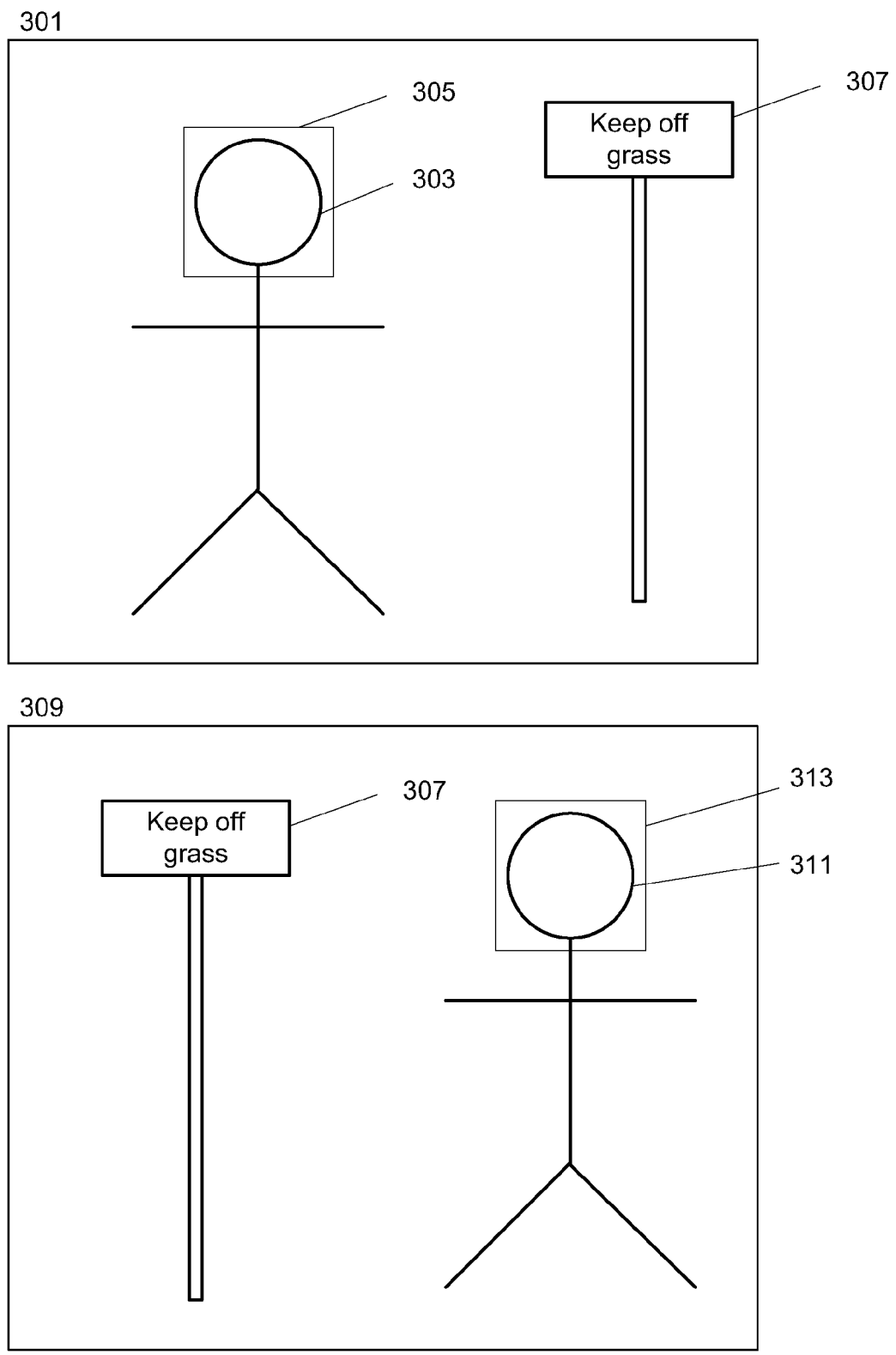
FIG. 3 is a diagram illustrating object matching between frames according to an embodiment of the invention.

FIG. 3 is a diagram illustrating object matching between frames according to an embodiment of the invention. Frame 301 and frame 309 may be frames of video data at different points in time. For example, frame 301 may occur at time x, while frame 309 occurs at time x+1. Face 303 is detected in frame 301 to the left of sign 307 and face 311 is detected in frame 309 to the right of the sign 307. In one embodiment, after face detection is complete, frame 301 is associated with face detection rectangle 305, while frame 309 is associated with face detection rectangle 313. In this embodiment, face recognition processing occurs in which faces between frames are compared to determine a likelihood that the same face occurs in different frames. If the likelihood exceeds a threshold, it may be assumed that face 311 is the same face as face 303.

Figure 4:
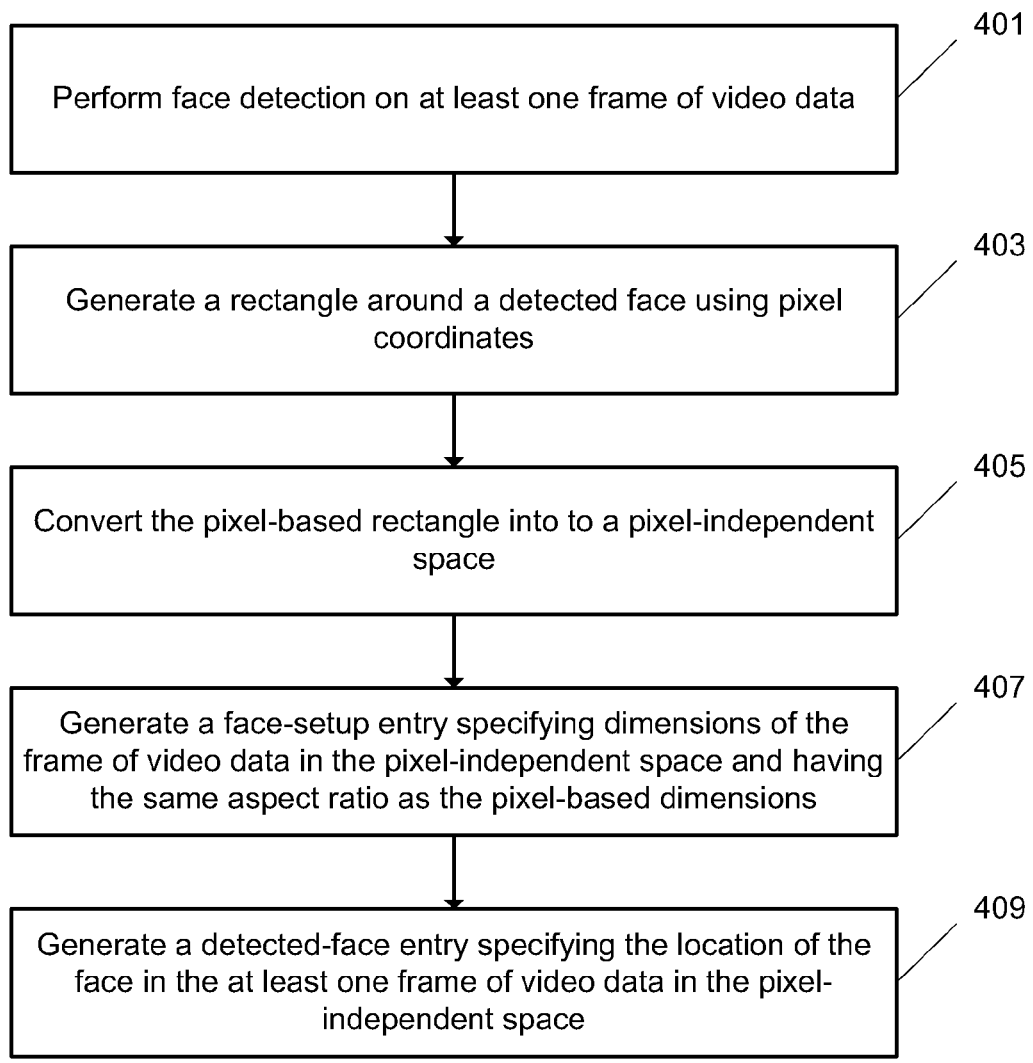
FIG. 4 is a flow chart illustrating a method of generating object detection metadata according to an embodiment of the invention.

FIG. 4 is a flow chart illustrating a method of generating object detection metadata according to an embodiment of the invention. For example, at block 401, the method performs face detection on at least one frame of image data, such as video data from a camcorder. At block 403, the method generates a rectangle around a detected face using pixel coordinates. That is, the initial point of the rectangle and the dimensions of the rectangle are measured in pixels relative to the image frame itself.

At block 405, the pixel-based rectangle is converted into a pixel-independent space. The dimensions of the pixel-independent space may be selected such that the aspect ratio of the pixel-independent space matches the aspect ratio of the image data. For example, if the image data is 640 pixels by 320 pixels, then the aspect ratio is the width divided by the height, which would result in an aspect ratio of 2:1. The pixel-independent space may be 120 units by 60 units in order to have the same aspect ratio.

At block 407, the method generates a face-setup entry specifying the dimensions of the frame of image data in the pixel-independent space. Face-setup entries are described in greater detail below in conjunction with FIG. 9. At block 409, the method generates a detected-face entry specifying the location of the face in the at least one frame of image data in the pixel-independent space. Detected-face entries are described in greater detail below in conjunction with FIG. 9.

Detection metadata for other objects in an image also can be generated in accordance with the process illustratively described with respect to FIG. 4. Face detection metadata is merely one example of an object detection metadata that can be generated.

Figure 5:
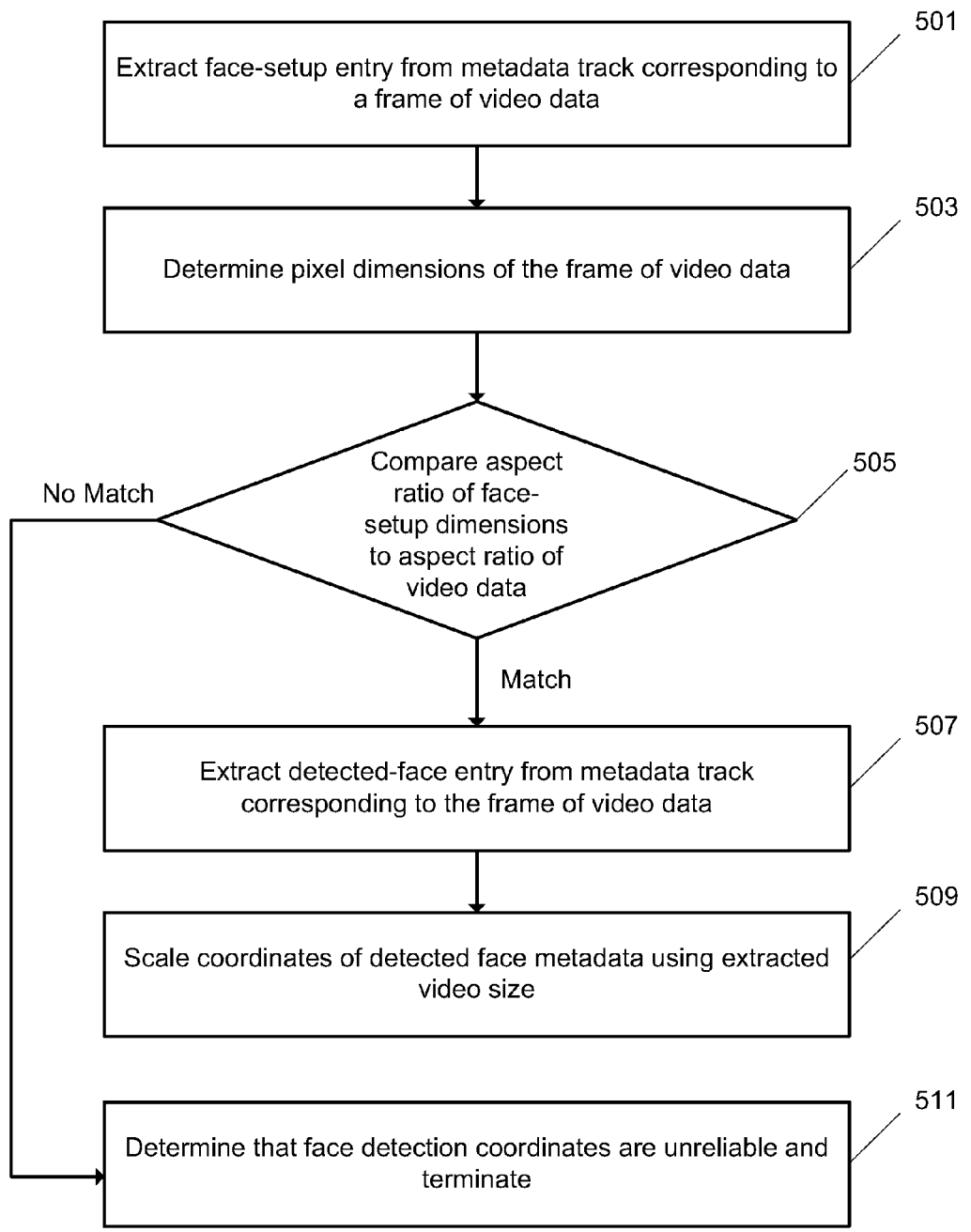
FIG. 5 is a flow chart illustrating a method of extracting object detection metadata according to an embodiment of the invention.

FIG. 5 is a flow chart illustrating a method of extracting object detection metadata according to an embodiment of the invention. For example, at block 501, the method extracts a face-setup entry from a metadata track corresponding to a frame of image data. The face-setup entry indicates how many faces have been detected in the image data and the pixel-independent dimensions of the image data.

At block 503, the method determines the pixel dimensions of the frame of image data. The aspect ratio of the pixel-independent dimensions from the face-setup entry is compared to the aspect ratio of the image data at decision 505. If the aspect ratios do not match, the method transitions to block 511 and determines that the face detection coordinates may be unreliable. For example, the image data may be resized in a way that changes the aspect ratio. The image data may have been modified from a widescreen format to a standard format. This modification changes the aspect ratio of the video data. The position of the face detection rectangle depends on the aspect ratio of the original image data. If the aspect ratio of the image data changes, the position of the face detection rectangle becomes unreliable and may be discarded.

If the aspect ratios of the image data and the face-setup entry match, or are substantially similar, the method extracts a detected-face entry from the metadata track corresponding to the frame of image data at block 507. The detected-face entry describes a particular face detected in the image data and is described in greater detail below in conjunction with FIG. 9. At block 509, the method scales coordinates of the detected face metadata using the image size extracted at block 503. Scaling is used to obtain pixel coordinates of the face detection rectangle relative to the frame of image data.

For example, the original image data may be 640 pixels by 480 pixels. The object detection method illustrated in FIG. 4 may be performed on the original image data to obtain the face detection rectangles. The resulting pixel-independent dimensions and coordinates of the face detection rectangle would correspond to the aspect ratio of the original image data. Subsequently, the image data may be resized in a way that preserves the aspect ratio. For example, the image data may be reduced from 640 pixels by 480 pixels to 320 pixels by 240 pixels. The aspect ratio remains the same, but the amount of image data is reduced, perhaps to facilitate streaming the image data over a low bandwidth connection (e.g., when the image data includes video data). The pixel coordinates of the face in the image data and its corresponding face detection rectangle change due to the reduced image size. By rescaling the rectangle based on the current size of the image data, the face detection rectangle accurately locates the face in the resized image data.

Detection metadata for other objects in an image also can be extracted in accordance with the process illustratively described with respect to FIG. 5. Face detection metadata is merely one example of an object detection metadata that can be extracted.

Figure 6:
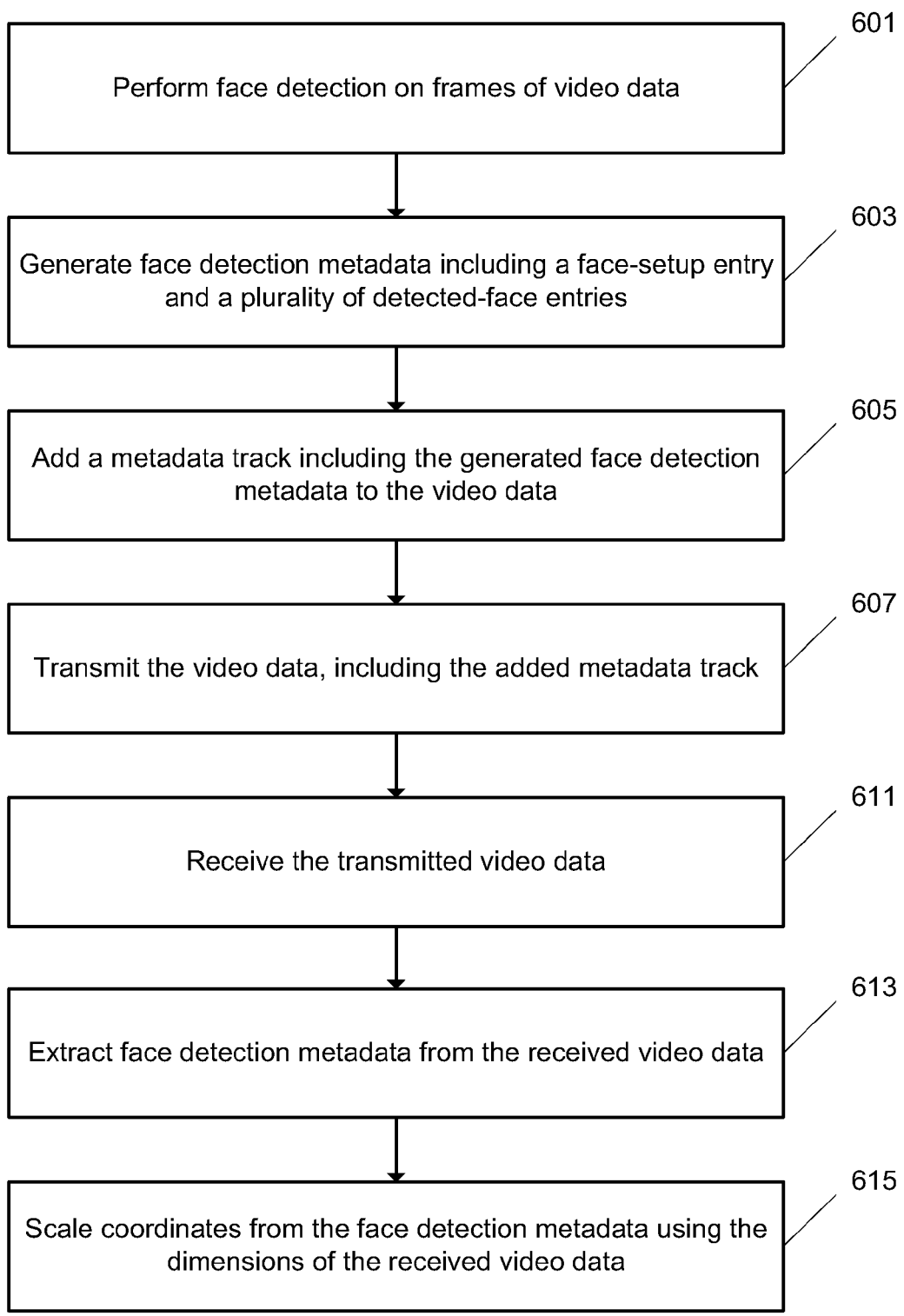
FIG. 6 is a flow chart illustrating a method of transmitting object detection metadata according to an embodiment of the invention.

FIG. 6 is a flow chart illustrating a method of transmitting object detection metadata according to an embodiment of the invention. For example, at block 601, the method performs face detection on frames of image data. This image data may be data originally captured by a video camera, or the image data may have been previously modified from its original form. At block 603, the method generates face detection metadata including a face-setup entry and a plurality of detected-face entries. Each detected-face entry corresponds to a face detected in a frame of the image data, while the face-setup entry specifies the pixel-independent dimensions of the image data and may include a value indicating how many faces were detected in the image data.

At block 605, the method adds a metadata track to the image data (e.g., video data). The added track includes the generated face detection metadata. In one embodiment, the face-setup entry is the first element in the added metadata track. At block 607, the method transmits the image data, including the added metadata track. For example, the image data may be streamed to a remote client. Alternatively, the image data may be downloaded to a remote client and then played locally on the remote client.

At block 611, the method receives the transmitted image data, for example, at the remote client. At block 613, the method extracts the face detection metadata from the received image data, for example, during playback of the image data. At block 615, the method scales coordinates from the face detection metadata using the dimensions of the received image data to provide accurate pixel coordinates of the face detection rectangles.

In one embodiment, the method illustrated in FIG. 6 is performed by more than one device. For example, blocks 601-607 can be performed by a first device and blocks 611-615 can be performed by a second device. In another embodiment, a single device consumes the object detection metadata that it generates. Devices may be specialized so that they only store and/or server object detection metadata and/or associated image data.

Detection metadata for other objects in an image also can be transmitted in accordance with the process illustratively described with respect to FIG. 6. Face detection metadata is merely one example of an object detection metadata that can be transmitted.

Figure 7:
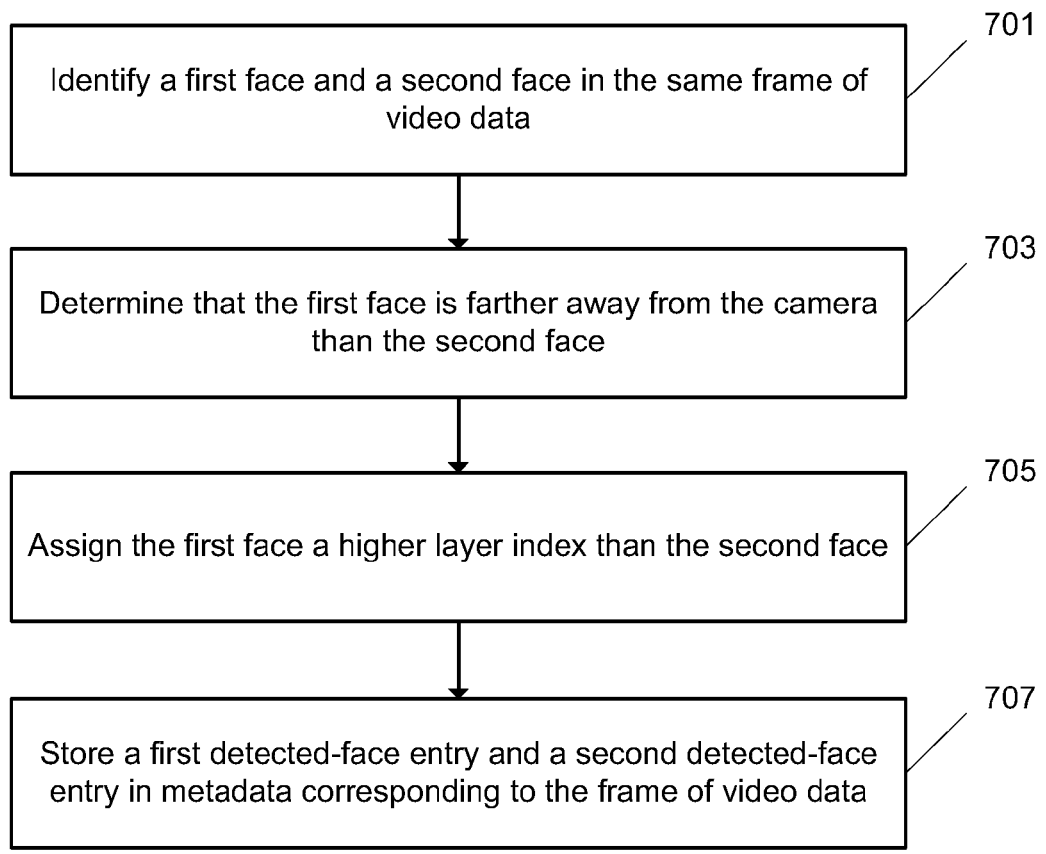
FIG. 7 is a flow chart illustrating object layering according to an embodiment of the invention.

FIG. 7 is a flow chart illustrating object layering according to an embodiment of the invention. For example, multiple faces may be layered in an image frame as illustrated in FIG. 2. For example, a person may be standing in front of another person relative to the image capturing device. In one embodiment, the faces may be assigned to different layers. The ordering of the layers may indicate whether one face is closer to the camera than another face in the same frame.

At block 701, the method identifies a first face and a second face in the same frame of image data. In one embodiment, this identification occurs as part of the face detection in the image data. At block 703, the method determines that the first face is farther away from the camera than the second face using techniques known in the art.

At block 705, the method assigns the first face a higher layer index than the second face since the first face is farther away than the second face, or vice versa. At block 707, the method stores a first detected-face entry and a second detected-face entry in the metadata corresponding to the current frame of image data. Detected-face entries are described in greater detail below in conjunction with FIG. 9.

Detection metadata for other objects in an image also can be processed in accordance with the process illustratively described with respect to FIG. 7. Face detection metadata is merely one example of an object detection metadata.

Figure 8:
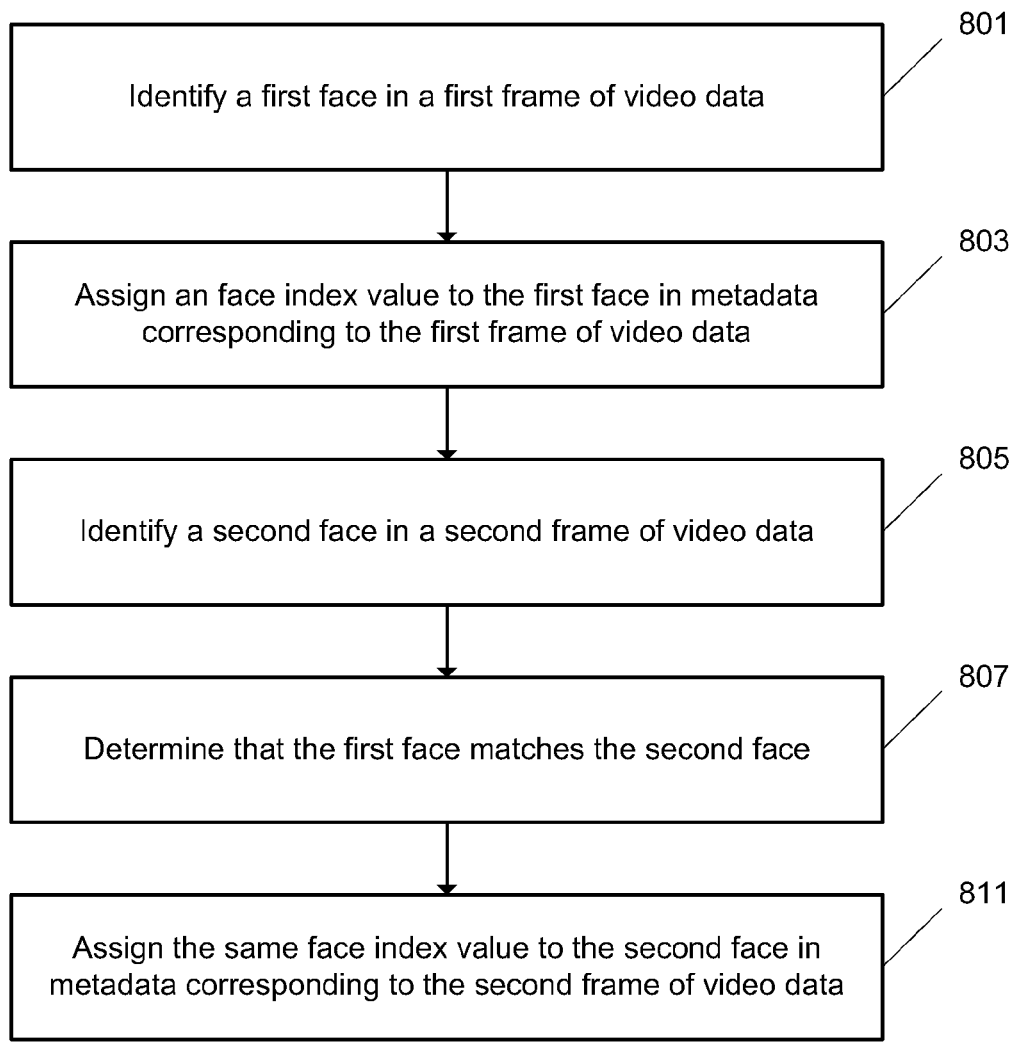
FIG. 8 is a flow chart illustrating object matching according to an embodiment of the invention.

FIG. 8 is a flow chart illustrating object matching according to an embodiment of the invention. For example, face matching may be performed after face detection is completed or while face detection is proceeding. Face matching determines if a face detected in a first frame is the same face as is detected in a second frame as illustrated in FIG. 3. Face matching may enable faces to be tracked from frame to frame.

At block 801, the method identifies a first face in a first frame of image data. At block 803, the method assigns a face index value to the first face in metadata corresponding to the first frame of image data. This metadata may be a detected-face entry. In one embodiment, as each new face is detected, the face is compared to previous faces using face recognition techniques known in the art and assigned the same face index if a match is found. In an alternate embodiment, each face is assigned an index value during a face detection process, and a subsequent face matching process determines if detected faces are the same face across different frames.

At block 805, the method identifies a second face in a second frame of image data and at block 807 determines that the first face in the first frame matches the second face in the second frame. In one embodiment, a face matching process generates a confidence value indicating how likely it is that the two detected faces correspond to the same "real" face. That is, each individual has a face. That face may be captured in two or more frames. Each frame that captures the face includes a detected face. The confidence value indicates a likelihood that two detected faces correspond to the same individual's face. Two faces may be considered as "matching" if the confidence value exceeds a predetermined threshold or compares in a predetermined manner to a predetermined threshold. The threshold value may be modified by a user or administrator. At block 811, the method assigns the same face index value to the second face in the metadata corresponding to the second frame of image data if the faces match.

Detection metadata for other objects in an image also can be processed in accordance with the process illustratively described with respect to FIG. 8. Face detection metadata is merely one example of an object detection metadata.

FIG. 9 is a diagram illustrating object detection metadata formats according to an embodiment of the invention. Object-setup entry 901 provides one example of a face-setup entry and can include a max-id, a width, and a height. The max-id indicates the highest face-id assigned during the face detection. In this example, the max-id is 7, indicating that seven faces were detected during face detection. In an embodiment in which face detection and face matching are interleaved, max-id may indicate the number of unique faces detected. In an embodiment in which face matching occurs after face detection, max-id may indicate a total number of faces detected and not indicate whether one or more match. Width and height of face-setup entry 901 indicates the pixel-independent dimensions of the image data. In one embodiment, the aspect ratio of the pixel-independent dimensions always matches the aspect ratio of the original image data.

Detected-object entry 903 provides one example of a detected-face entry in a metadata track of image data. X and Y can correspond to the coordinates of the upper left-hand corner of a face detection rectangle as measured in pixel-independent coordinates. The width and height correspond to the width and height of the face detection rectangle as measured in the pixel-independent coordinates. ID is a numeric identifier assigned to the particular face described by detected-face entry 903. Layer corresponds to the layer index described above with respect to FIGS. 2 and 7. In another embodiment, the object perimeter may be a circle or oval. In this embodiment, a radii of the circle or oval and a center point may be stored rather than a top-left coordinate and a width and height. The radii and center point provide a location and dimensions of the object perimeter. Other shapes may also be used. In still another embodiment, the location and dimensions of the object perimeter may be specified using coordinates (e.g., a top-left corner and a bottom-right corner, rather than a top-left corner and a width and height.)

DetectWeight can be a confidence value having a range of values (e.g., between 0 and 255). DetectWeight indicates the likelihood that the object detection perimeter described by the detected-object entry contains an object that we wish to detect (e.g., a face). In this example, the DetectWeight value is 243, which can indicate a strong likelihood that the face detection rectangle contains a face. In one embodiment, the DetectWeight is compared to a predetermined threshold. If the DetectWeight is less than the threshold, no detected-face entry is generated for the detected face. The threshold may be modified by a user or administrator.

MatchWeight can be another element of detected-object entry 903. MatchWeight can be a value within a range (e.g., between 0 and 255) that indicates the likelihood that the object (e.g., a face) described by detected-object entry 903 is the same as the other detected-object entries using the same object ID.

In one embodiment, object detection is performed on image data and the resulting object detection metadata can be stored as clip-based image data or as time-based metadata. In time-based metadata, each detected-object entry applies to one or more temporally aligned frames of video data. If the duration of a detected-object entry spans more than one video frame, it may be the correct entry for one of the frames, and "appropriate" for the other frames. Generally, the entry is most precise for the first temporally aligned video frame. In another embodiment, after object detection is performed on the video data, the video data is processed to reduce the frame rate. In this case, more than one detected-object entry may correspond, time-wise, to the same frame of video data. In this case, the first detected-object entry may be considered the most descriptive.

Figure 10:
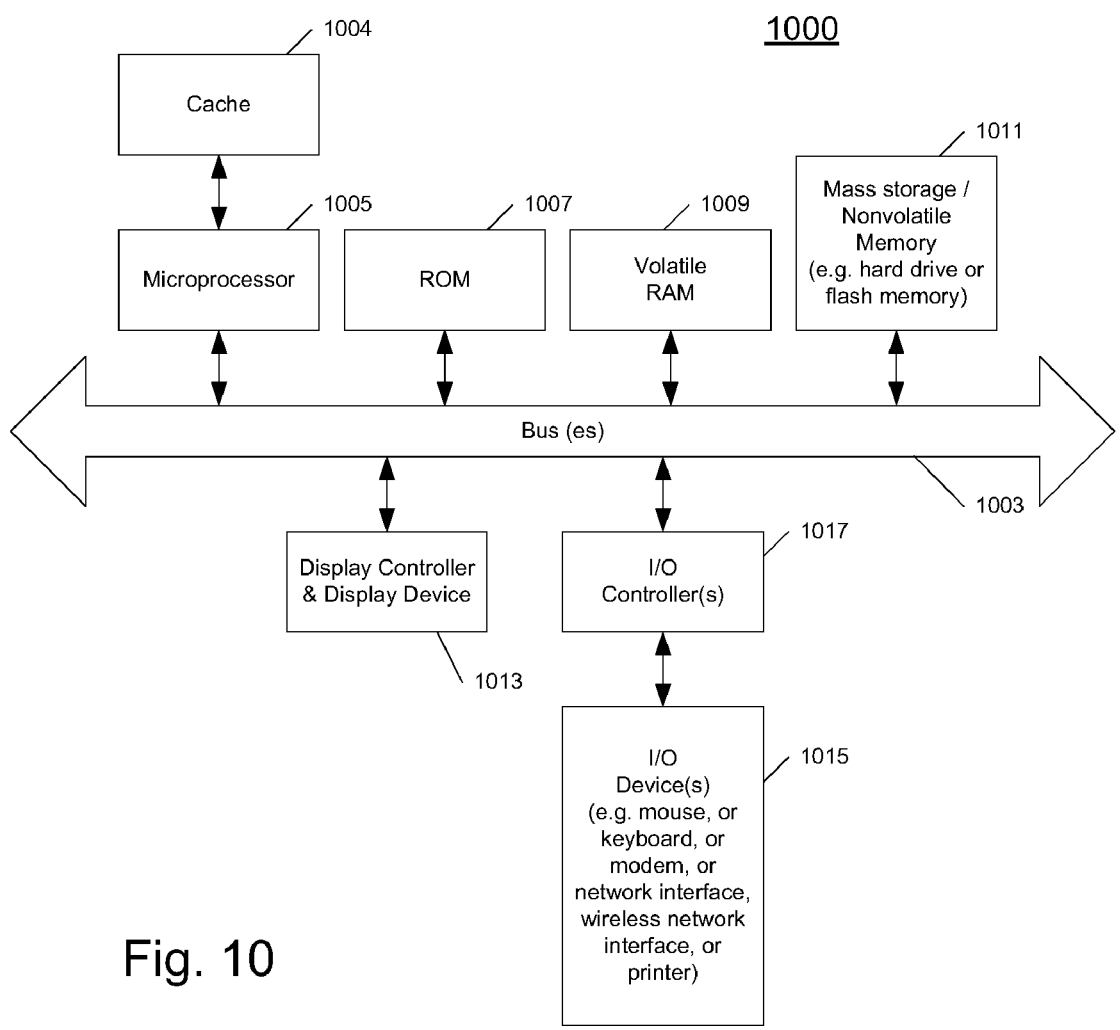
FIG. 10 is a diagram of a data processing system that may be used with embodiments of the invention.

FIG. 10 shows one example of a data processing system, which may be used with one embodiment the present invention. Note that while FIG. 10 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 is coupled to cache 1004. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, touch screens, touch pads, touch sensitive input devices, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or a flash memory or other types of memory systems which maintain data (e.g., large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
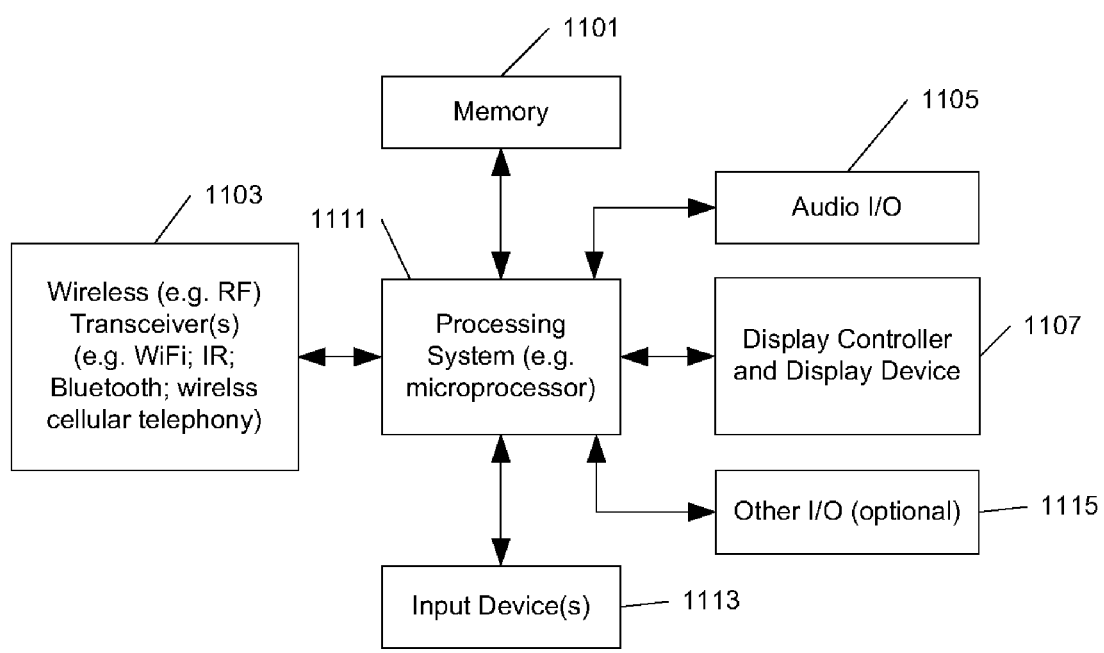
FIG. 11 is a diagram of a device that may be used with embodiments of the invention.

FIG. 11 shows an example of another data processing system which may be used with one embodiment of the present invention. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105 which may include a microphone and a speaker for, for example, playing back music or providing telephone functionality through the speaker and microphone.

A display controller and display device 1107 provide a visual user interface for the user; this digital interface may include a graphical user interface which is similar to that shown on a Macintosh computer when running OS X operating system software. The system 1100 also includes one or more wireless transceivers 1103 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system.

The data processing system 1100 also includes one or more input devices 1113 which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1100 may be a network computer or an embedded processing device within another device, or other types of data processing systems which have fewer components or perhaps more components than that shown in FIG. 11.

Figure 12:
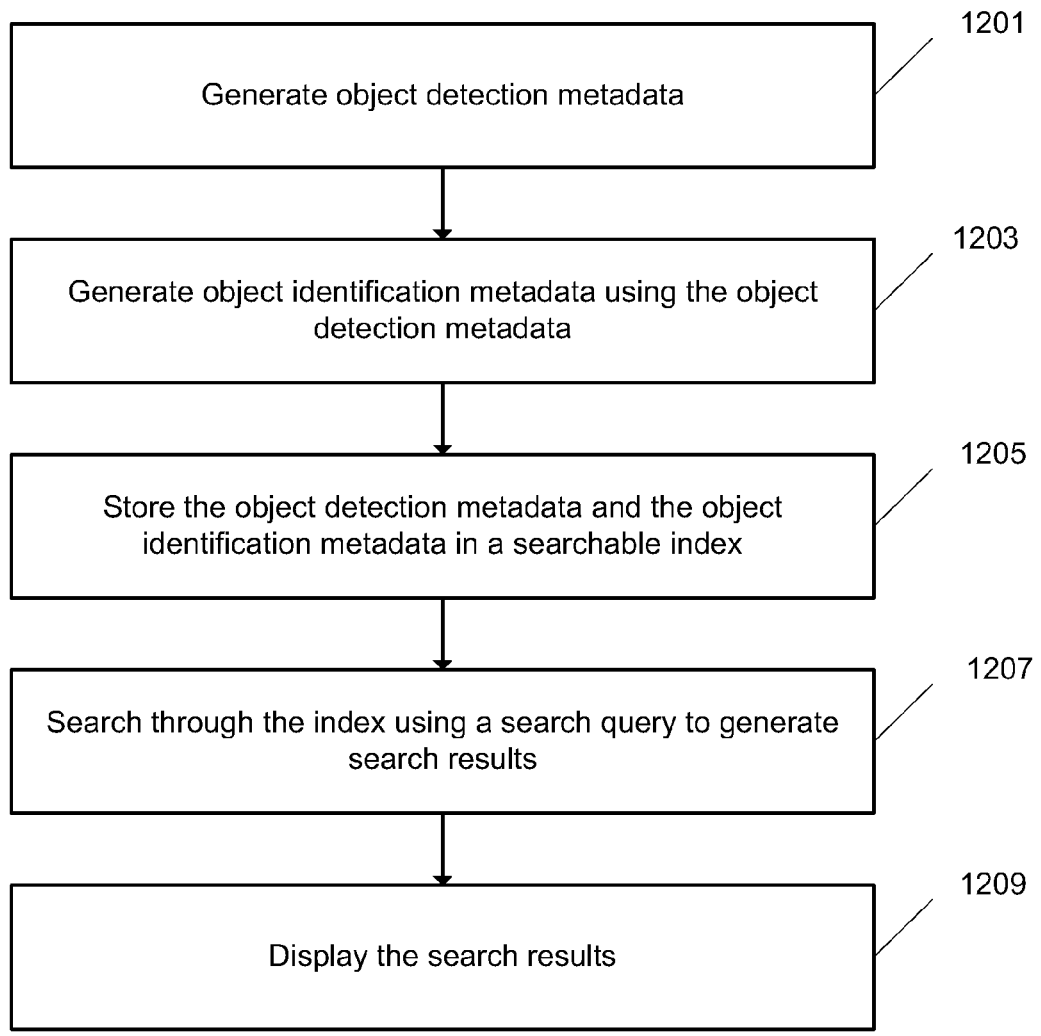
FIG. 12 is a flow chart illustrating a method of searching an index of object detection metadata according to an embodiment of the invention.

FIG. 12 is a flowchart illustrating a method of searching an index storing object detection metadata. At block 1201, the method generates object detection metadata. Objects may include human faces, animal faces, and other physical objects (e.g., an automobile, a license plate on an automobile, etc.). Different techniques may used to detect different objects. For example, one technique may be better suited to detecting animal faces than human faces. Object detection metadata may be similar in format to illustrative face detection metadata described above, be based on using a perimeter around the detected object, and/or be expressed in a pixel-independent coordinate space.

At block 1203, the method generates object identification metadata using the object detection metadata. Object identification metadata assigns an identity to a detected object. For example, if the object detection perimeter bounds a license plate, the object identification metadata may include an alphanumeric string corresponding to the contents of the license plate and may be obtained using optical character recognition (OCR) techniques known in the field. In one embodiment, attributes of the object may be detected and/or identified and included in the metadata. For example, if the object is an automobile, the color, make, model, etc. of the automobile may be identified and added to the metadata.

At block 1205, the method stores the object detection metadata and the object identification metadata in a searchable index. The searchable index may be an index database. The contents of the searchable index may include metadata describing features in still images, frames of video image data, etc. The still images and video may be captured by different sources. For example, the searchable index may include metadata describing photos taken with a user's cell phone, photos taken with a user's camera, video captured with a user's video recorder, etc. In one embodiment, object matching metadata is also generated and stored in the searchable index. The object matching may match objects across different still images and video images.

At block 1207, the method can search through the index using a search query to generate search results. The search can be initiated, for example, in response to a search command. The search query may be a string or other information. For example, the search query can be the name of a person whose face may occur in the metadata. As another example, the search query can be for white-colored automobiles. At block 1209, results of can be provided and/or displayed, such as on a display device 1013 or 1107.

In one embodiment, a single device performs blocks 1201-1209. In another embodiment, a first device generates feature detection metadata (1201), a second device generates feature identification metadata (1203), a third device stores the metadata in a searchable index (1205) and searches through the metadata (1207) while a fourth device displays results of the search (1209). In other embodiments, different work distribution is used.

Figure 13:
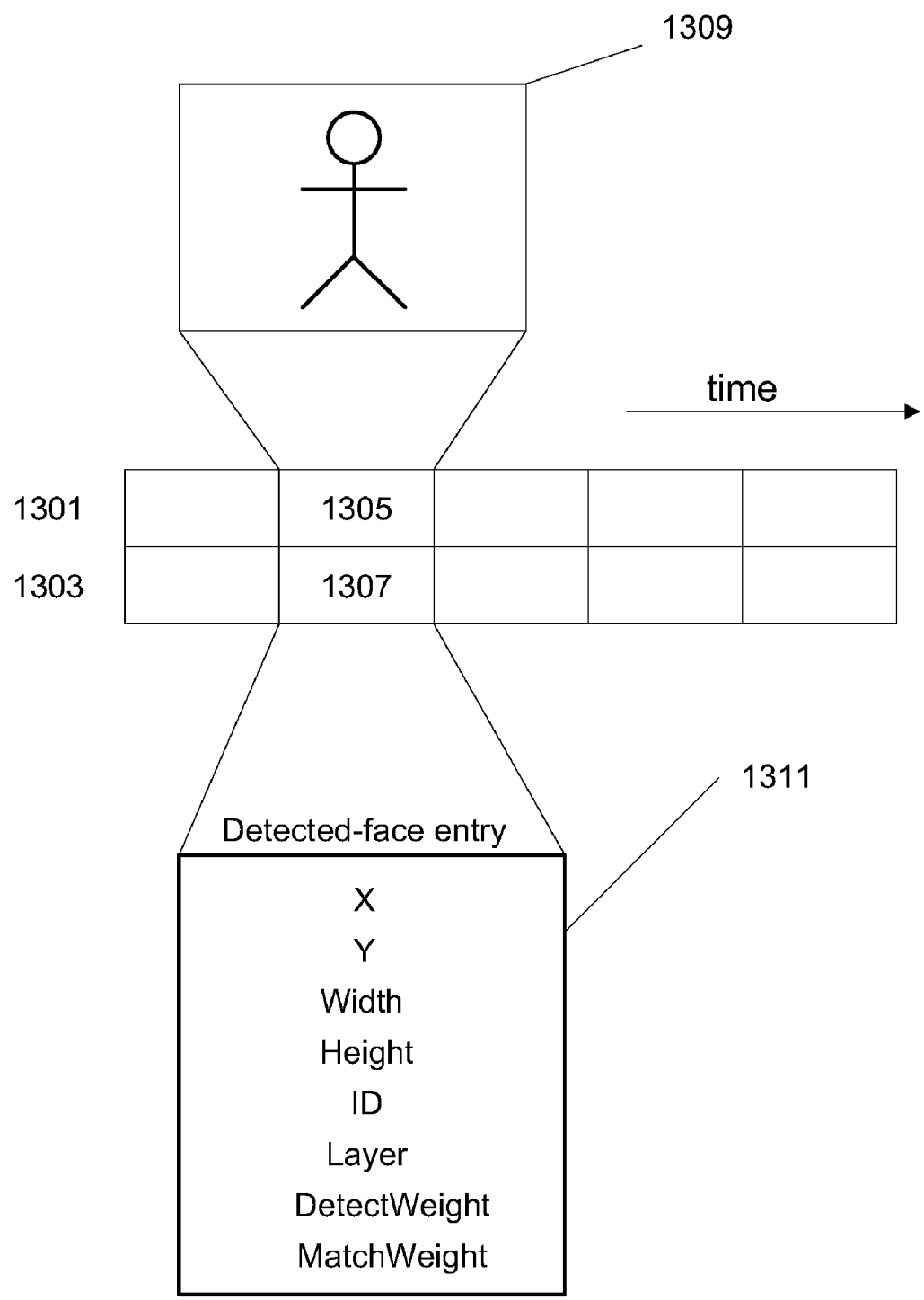
FIG. 13 is a diagram illustrating a relationship between a track of image data and a track of object detection metadata.

FIG. 13 is a diagram illustrating a relationship between a track of image data and a track of object detection metadata. Track 1301 includes frames of image data over time which may be replayed as a video. Track 1303 includes detected object metadata entries. Frame 1305 in track 1301 corresponds to image frame 1309. Metadata entry 1307 corresponds to detected face entry 1311 and includes metadata describing a detected object in frame 1305, such as the face of the person captured in image data 1309. Metadata track 1303 may also include one or more set up entries as described above.

In the foregoing specification, object detection metadata has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for generating face detection metadata, the method comprising:
    generating a perimeter around a detected face in a frame of video data, the perimeter using a first coordinate system;
    converting, by a data processing system, the perimeter from the first coordinate system into a second coordinate system, wherein an aspect ratio of dimensions of the perimeter in the first coordinate system matches an aspect ratio of the dimensions in the second coordinate system;
    generating a first metadata entry including dimensions of the frame of video data in the second coordinate system;
    generating a second metadata entry including information that provides a location and dimensions of the converted perimeter in the second coordinate system.

2. The method of claim 1, wherein the location comprises a point indicating the top-left corner of a rectangle and the dimensions of the converted perimeter comprise a width and a height of the rectangle.

3. The method of claim 1, wherein:
    the first metadata entry further includes an indication of a total number of detected faces; and
    the dimensions of the frame of video data in the second coordinate system comprise a width and a height.

4. The method of claim 1, further comprising storing the first metadata entry and the second metadata entry in a metadata track corresponding to the video data.

5. The method of claim 4, wherein the metadata track is configured for time-based metadata storage, the metadata entries in the metadata track being temporally-aligned with the video data.

6. A non-transitory machine readable storage medium storing instructions which when executed by a processor cause a device to perform operations, the operations comprising:
    generating a perimeter around a detected object in a frame of video data, the perimeter using a first coordinate system, and the first coordinate system having a first aspect ratio;
    converting the perimeter from the first coordinate system into a second coordinate system, wherein dimensions of the second coordinate system have a second aspect ratio matching the first aspect ratio;
    generating a first metadata entry including dimensions of the second coordinate system;

generating a second metadata entry including location and dimensions of the converted perimeter in the second coordinate system.

7. The non-transitory machine readable storage medium of claim 6, wherein the detected object is one of a human face and an animal face.

8. The non-transitory machine readable storage medium of claim 6, wherein the detected object is physical object.

* * * * *